April 30, 1968 C. F. HAUGH 3,381,241
CIRCUIT FOR RESONANT CHARGING OF REACTANCE
IN RESPONSE TO DATA SOURCE
Filed June 21, 1965

INVENTOR
CONNOR F. HAUGH

BY W S Robertson

ATTORNEY

United States Patent Office 3,381,241
Patented Apr. 30, 1968

3,381,241

CIRCUIT FOR RESONANT CHARGING OF REACTANCE IN RESPONSE TO DATA SOURCE

Connor F. Haugh, Poughkeepsie, N.Y., assignor to International Business Machines Corporation, Armonk, N.Y., a corporation of New York Filed June 21, 1965, Ser. No. 465,344
6 Claims. (Cl. 332—14)

This invention relates generally to electrical circuits for pulse modulating systems; more specifically to a circuit for establishing the presence or absence of an electrical pulse at a predetermined frequency.

There are several applications for circuits that produce a selected pattern of electrical pulses. In the example that will be used to illustrate the invention, a pulse and the absence of a pulse represent the two values in a binary communications system. An oscillator establishes the data frequency and during each cycle (or multiple) a pulse is transmitted or not transmitted according to the input data. A general object of this invention is to provide a new and improved circuit of this type.

The features and advantages of this circuit are particularly well illustrated in the application for modulating the amplitude of a voltage on a crystal. Some crystals have the property of rotating the plane of polarization of light that they transmit when a voltage is applied to two electrodes attached to the crystal. The plane of polarization is rotated in one direction for one polarity of voltage and is rotated in the other direction for the other polarity. The prior art has suggested modulating the plane of polarization of the light beam to represent binary data; such a light beam can be demodulated at a receiving station by apparatus that includes polarizing filters and light sensitive devices.

One of the problems that such a circuit presents is that the crystal requires considerable power and a high voltage, a few thousand volts. A more specific object of this invention is to provide a new and improved circuit that uses very little power in an application such as modulating a crystal in which considerable power is transmitted to a load device.

In a specific circuit that will be described the output of the circuit is applied to a crystal that has the electrical characteristics of a capacitor. Each full cycle of an oscillatory voltage is applied to the crystal or not applied to represent binary ones and zeros. The oscillatory voltage is generated by circuits that are inductive at the data frequency. The inductance is made to have the appropriate value with respect to the load capacitance to make the circuit resonant; this reduces the power consumption of the circuit.

One feature of the circuit is that the modulating devices operate as switches. The voltage on the load capacitance is modulated by switching the load in and out of the circuit. The circuit includes a second capacitor of the same value as the load capacitor and two switches are controlled according to the input data to connect one or the other of the two capacitors into the circuit.

The switches are operated at current zeros in the oscillatory cycle. In the preferred embodiment of the invention the current zeros are made to coincide with voltage zeros. The capacitors are biased by a direct voltage source that equals the peak value of the oscillatory voltage. This bias offsets the voltage wave so that the peak of the oscillatory component of the voltage (which coincides with current zeros in the resonant circuit) combines with the biasing voltage to produce zero voltages across the switches at the time in the cycle when the switches are operated.

In the specific circuit that will be described the inductance of the oscillatory source is formed in part by a transformer. The transformer provides the high voltage required by the crystal from a relatively low voltage source. The feature that the source supplies a sinusoidal voltage makes it possible to transmit a simple sinusoid through the transformer without producing undesirable harmonics in the load or source.

One feature of the circuit is that the switches block voltage in only one polarity. Therefore the switches can be made up of unilateral control devices such as transistors. These transistors can be bypassed by unilateral uncontrolled devices such as diodes for conducting the opposite half cycle.

Another feature of the circuit is that the switches have the same polarity, that is, they block the same polarity voltage when they are open. This feature simplifies the circuitry for connecting the control terminals of the switch devices to the data input terminals.

Another feature of this circuit is that one side of each switch is at alternating current ground and it can be arranged to be at direct current ground also.

So far, the circuit has been described in an application for energizing a capacitive load. The more detailed description will also explain a dual of this circuit. With the more detailed explanation other applications, features, advantages and objects of the circuit will be apparent.

*The drawing.*—FIG. 1 is a schematic of the circuit of this invention.

Figure 1:
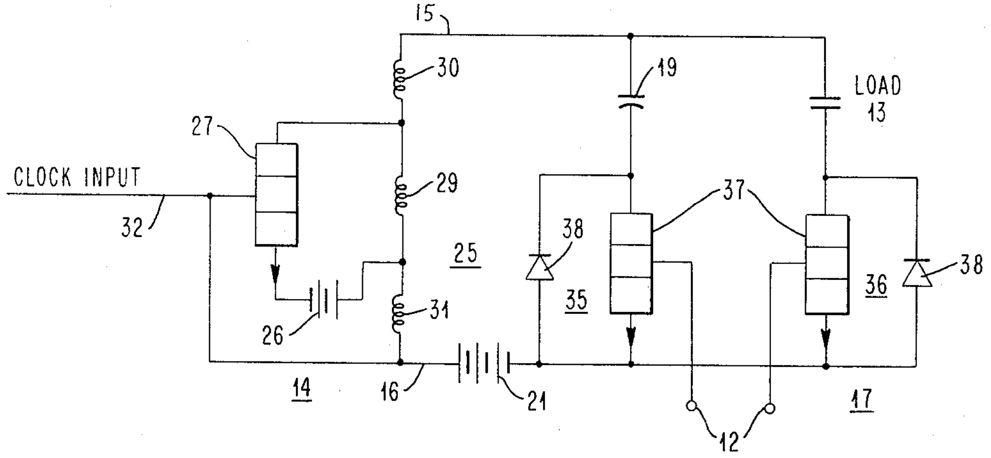

*The circuit of FIG. 1.*—The circuit of FIG. 1 operates in response to a data input at a pair of terminals 12 to produce a modulated voltage across a capacitive load 13. As the introduction has described, capacitor 13 may be an optical crystal that modulates the polarization of light in response to a voltage at its terminals. An oscillator 14 provides an oscillatory voltage at terminals 15, 16 and a switch device 17 operates to connect oscillator 14 to energize either capacitive load 13 or a capacitor 19 having an equal capacitance. The circuit also includes a biasing source 21 that is connected to offset the voltage waveform as will be explained later.

The oscillator 14 preferably comprises a transformer 25, a direct voltage source 26 and a transistor 27 that is interconnected with the transformer as a Hartley oscillator. Transformer 25 has a common winding portion 29 that is energized by source 26 and two series winding portions 30, 31 that cooperate to form an auto-transformer to produce a high voltage across terminals 15, 16. Series winding portion 31 is connected to provide feedback to the base terminal of transistor 27 for oscillator operation.

The operation of the Hartley oscillator is well known. The frequency of the oscillator is established for the most part by the values in the resonant circuit formed by transformer 25 and either capacitor 13 or 19. Thus, the circuit does not require special means to tune the oscillator to the load.

Oscillator 14 is connected to receive a clock input 32 from the source of the input data at terminal 12. In the circuit of FIG. 1 the input is applied to the base terminal of transistor 27.

Switch means 17 preferably comprises individual switches 35, 36 for each capacitor 13 and 19. Preferably the switches are made up of suitable series or parallel arrangements of transistors appropriate to the current to be conducted and the voltage to be blocked. (The switches do not interrupt appreciable current.) Such circuits are well known and are represented by single transistors 37 in each switch 35, 36. These transistors are polarized to conduct in the same direction for reasons that will be described later in the operation of the circuit. Each transistor switch 35, 36 is arranged to be bypassed by a suitable arrangement of diodes 38 for conducting reverse current. Such diode arrangements are also well known. The transistors 37 of switch devices 35, 36 have their base terminals coupled to input terminals 12 to be turned on and off alternately in response to the data input.

The specific components of FIG. 1 can be generalized as follows for understanding the operation of the circuit. Transistor 27, source 26 and a portion of transformer 25 form an oscillator 14 having a predetermined frequency. Capacitors 13, 19 can be considered to be loads substantially independent of the oscillator frequency or to be a part of the oscillator frequency establishing network as in the specific circuit of FIG. 1. The reactance of transformer 25, along with incidental inductance in the circuit is more generally an inductance in a resonant circuit with the selected capacitor. Considered as a transformer, transformer 25 has well known equivalents such as two conductively isolated windings.

Figure 3:
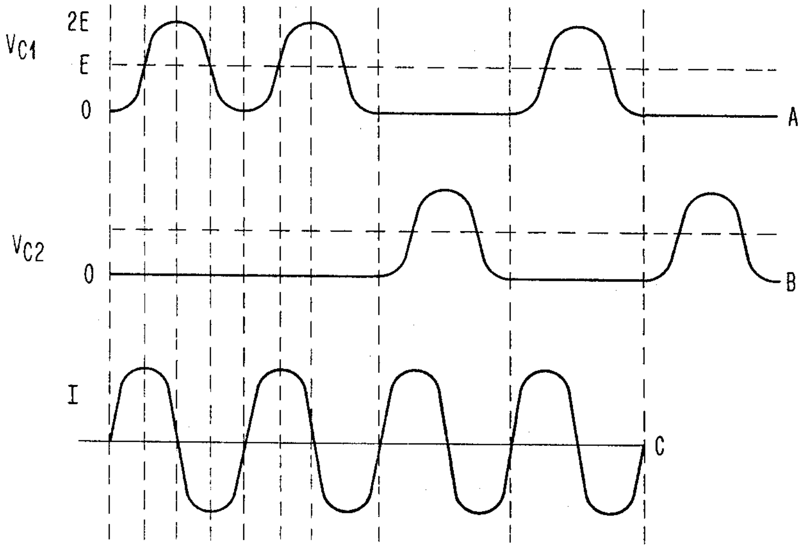
FIG. 3 shows current and voltage waveforms representing an arbitrary message.

*Operation.*—Suppose that switch unit 35 is closed and switch 36 is open for some indefinite time. In this condition the oscillator drives the resonant circuit of transformer 25 and capacitor 19 to produce an oscillatory voltage across the transformer winding and across the capacitor. This voltage is shown in FIG. 3A in the first two complete cycles. The oscillatory components of this waveform have a peak voltage equal to the voltage across terminals 15, 16 (and equal to the source voltage by the turns ratio of the transformer).

The voltage source 21 in the resonant circuit is given a value equal to the oscillatory voltage at terminals 15, 16 (that is, equal to half the peak-to-peak value across terminals 15, 16). With this value source 21 offsets the voltage waveform so that the lowermost peaks occurs at zero voltage with respect to the ground reference line at terminal 16. In the resonant circuit without source 21 current zeros occur at maximum voltage across capacitor 19 or 13 (the capacitor is fully charged or discharged and the current direction is changing) and maximum votlage across the inductor (associated with the maximum rate of change of current that occurs when the current value is zero). Source 21 is given the appropriate voltage to offset the voltage across these components so that the voltage around the loop is zero. The switches are operated only at these points of zero voltage and current where it is much simpler to interrupt the circuit and where transitions between capacitors can be made with substantially no transients.

In the operation of the circuit in response to data at terminals 12, transistors 35, 36 are switched on and off in a pattern such as FIG. 3A and B illustrate. For example, suppose that switch 35 had been closed as in the previous example in the first two cycles of FIG. 3A and that at the end of the second cycle switch 36 is closed and switch 35 is open. As FIG. 3C shows, switch 35 is open at a time when the current is zero and changing in a direction to be conducted by switch 35. Thus, when switch 36 closes it begins conducting at a zero in a current sinusoid and it conducts as capacitor 35 charges. At the end of the first half cycle in the current waveform the current polarity reverses and conduction occurs in the associated diode 38.

Figure 2:
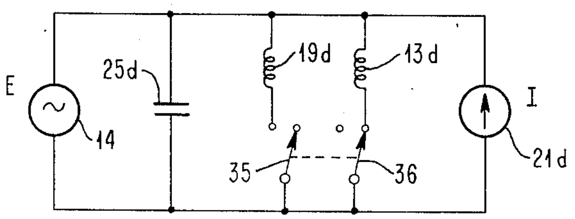
FIG. 2 is a dual of the circuit of FIG. 1.

*The circuit of FIG. 2.*—FIG. 2 shows a dual of the circuit of FIG. 1. The well known rules for forming the dual are summarized in Skilling, Electrical Engineering Circuits, John Wiley & Sons, Inc., p. 211. Components of the circuit of FIG. 2 have the same numbers as the circuit of FIG. 1 with the subscript *d* to indicate the duality when appropriate. Thus, the load 13*d* is a device that appears to be inductive such as a magnetic core and a corresponding dummy load device is provided by means of a discrete or distributed inductance 19*d*. The oscillator 14 is of any suitable type and may appear to be either capacitive, inductive, or nonreactive. The means coupling the oscillator to the inductive components of the circuit is capacitive or is made to appear to be capacitive by means of series capacitors or appears to be capacitive because of the arrangement of the oscillator. This capacitance is shown as a discrete capacitor 25*d*. The biasing source 21*d* is a current source having a value that is appropriate to offset the current waveform to zero when the voltage waveform is zero. That is, except for source 21*d* the switches would open at zero voltage across the inductor at zero voltage and maximum current. Bias source 21*d* offsets the current waveform to be zero at the switching time. To generalize FIGS. 1 and 2, components 25 and 25*d* are each the conjugate of the associated component 13 or 19 and 13*d* or 19*d*.

*Other embodiments.*—The circuits of FIGS. 1 and 2 have been described as producing a constant amplitude sinusoid across terminals 15, 16. The circuit can also be operated with amplitude modulated sinusoids at terminals 15, 16 and still retain many of the features of the circuits of FIGS. 1 and 2. For example, the two sources 21, 26 can be varied together to maintain the appropriate offset for current and voltage zeros to coincide. One suitable circuit comprises switches in both sources connected to operate together to charge the two sources in corresponding steps; alternately the oscillator can be modulated by conventional circuitry and a measure of the modulated voltage detected to provide a signal for modulating source 21 correspondingly.

From the description of a detailed embodiment of the invention, the dual of this circuit, and the suggestions for generalizing the specific components of the circuit and for specific variations in the circuits, those skilled in the art will recognize a variety of applications of the circuit of this invention and appropriate modifications within the spirit of the invention and the scope of the claims.

What is claimed is:

1. A circuit for producing a selected pattern of pulses across a reactive load device at a predetermined frequency comprising:
   - a second electrically similar reactive load device;
   - a conjugate reactance having a value to form with either of the other said reactances a circuit that is resonant at said frequency;
   - switch means for selectively connecting one or the other of said first and second reactances in circuit with said conjugate reactance at selected points in the oscillatory cycle; and
   - means for exciting said circuit to oscillate at said resonant frequency.

2. A circuit according to claim 1 in which said first two reactances are capacitances and said third reactance is an inductance.

3. The circuit according to claim 2 in which said means for exciting said resonant circuit comprises an oscillator producing substantially a sinusoidal waveform.

4. A circuit according to claim 3 in which said inductance is associated with a transformer coupling said resonant circuit to said oscillator.

5. A circuit according to claim 4 including a time invariant voltage bias source in a resonant circuit equal to one-half the peak-to-peak value of the oscillatory voltage.

6. A circuit according to claim 5 including means for operating said switches at selected points of zero voltage and current in the waveform across the switches.

References Cited

UNITED STATES PATENTS

| | | | |
|---|---|---|---|
| 3,072,854 | 1/1963 | Case | 332—9 X |
| 3,118,116 | 1/1964 | Freedman | 332—11 X |
| 3,154,749 | 10/1964 | Perkins | 332—11 X |
| 3,215,478 | 11/1965 | Langan | 328—66 X |
| 3,292,091 | 12/1966 | Kosanke et al. | 307—88.5 |
| 3,351,873 | 11/1967 | Kimura | 332—9 |

ALFRED L. BRODY, *Primary Examiner.*

ROY LAKE, *Examiner.*